US010030732B2

United States Patent
Chiu et al.

(10) Patent No.: US 10,030,732 B2
(45) Date of Patent: Jul. 24, 2018

(54) LENS DRIVING MODULE AND SPRING PLATE THEREOF

(71) Applicant: TDK TAIWAN CORP., Yangmei Taoyuan (TW)

(72) Inventors: Ching-Chung Chiu, Yangmei Taoyuan (TW); Chih-Yu Liu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 251 days.

(21) Appl. No.: 14/713,886

(22) Filed: May 15, 2015

(65) Prior Publication Data
US 2016/0187612 A1 Jun. 30, 2016

(30) Foreign Application Priority Data

Dec. 26, 2014 (TW) .............................. 103145690 A

(51) Int. Cl.
| | | |
|---|---|---|
| *F16F 1/18* | (2006.01) | |
| *G02B 7/02* | (2006.01) | |
| *G02B 7/08* | (2006.01) | |
| *F16F 1/02* | (2006.01) | |

(52) U.S. Cl.
CPC .............. *F16F 1/18* (2013.01); *F16F 1/027* (2013.01); *G02B 7/026* (2013.01); *G02B 7/08* (2013.01)

(58) Field of Classification Search
CPC ... G02B 7/02–7/026; F16F 1/18; F16F 1/027; G11B 7/0908; G11B 7/0925; G11B 7/094; G11B 7/0941; G11B 7/0945; G11B 7/0946; G11B 7/0948; G11B 7/0943; H02K 41/0354
USPC .................................. 359/819–830; 348/357
See application file for complete search history.

(56) References Cited

U.S. PATENT DOCUMENTS

| | | | | |
|---|---|---|---|---|
| 7,675,566 | B2 * | 3/2010 | Tagome ................. | G02B 7/026 348/357 |
| 8,233,083 | B2 * | 7/2012 | Takatsuka ................ | G02B 7/08 348/373 |
| 8,531,789 | B2 * | 9/2013 | Osaka ..................... | F16F 1/021 359/811 |
| 2014/0327965 | A1 * | 11/2014 | Chen .................... | G02B 27/646 359/557 |

FOREIGN PATENT DOCUMENTS

EP      1873568 A1 *   1/2008   .............. F16F 1/185

* cited by examiner

*Primary Examiner* — Ricky Mack
*Assistant Examiner* — Kristina Deherrera
(74) *Attorney, Agent, or Firm* — Muncy, Geissler, Olds & Lowe, P.C.

(57) ABSTRACT

A spring plate of a lens driving module is provided, including an outer frame, an inner frame, an inner string and a hollow. The outer frame is configured to connect with a fixed part of the lens driving module. The inner frame is configured to connect with a movable part of the lens driving module. The inner string is extended from the outer frame and the inner frame and connected therebetween. The hollow is disposed on the inner string for dispersing stress.

20 Claims, 5 Drawing Sheets

LENS DRIVING MODULE AND SPRING PLATE THEREOF

CROSS REFERENCE TO RELATED APPLICATIONS

The present application claims priority of Taiwan Patent Application No. 103145690, filed on Dec. 26, 2014, the entirety of which is incorporated by reference herein.

BACKGROUND OF THE INVENTION

Field of the Invention

The invention relates to a lens driving module and a spring plate thereof, and in particular to a spring plate of a lens driving module having a strengthened structure.

Description of the Related Art

Many mobile devices nowadays, such as mobile phones, are equipped with digital camera functions as a basic requirement, and this is thanks to the miniaturization of lens driving modules. In order to provide automatic focusing or zooming, a commonly used miniature lens driving module is a Voice Coil Motor (VCM), which carries a lens and can move the lens back and forth along an image-capturing optical axis by means of a coil, a magnet, and a spring plate.

However, the spring plate in the traditional lens driving module often has insufficient structural strength and is prone to permanent (plastic) deformation. Therefore, how to strengthen the structure of the spring plate, thereby extending the life of the whole lens driving module, deserves careful consideration.

BRIEF SUMMARY OF THE INVENTION

An embodiment of the invention provides a spring plate of a lens driving module, including an outer frame, an inner frame, an inner string, and a hollow. The outer frame is configured to connect with a fixed part of the lens driving module. The inner frame is configured to connect with a movable part of the lens driving module. The inner string is extended from the outer frame and the inner frame and connected therebetween. The hollow is disposed on the inner string for dispersing stress.

Another embodiment of the invention provides a lens driving module, including a casing, a base, a lens carrier, and a spring plate. The base is connected with the casing to form a receiving space. The lens carrier is movably disposed in the receiving space. The spring plate includes an outer frame, an inner frame, an inner string, and a hollow. The outer frame is configured to connect with the casing or the base. The inner frame is configured to connect with the lens carrier. The inner string is extended from the outer frame and the inner frame and connected therebetween. The hollow is disposed on the inner string for dispersing stress.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
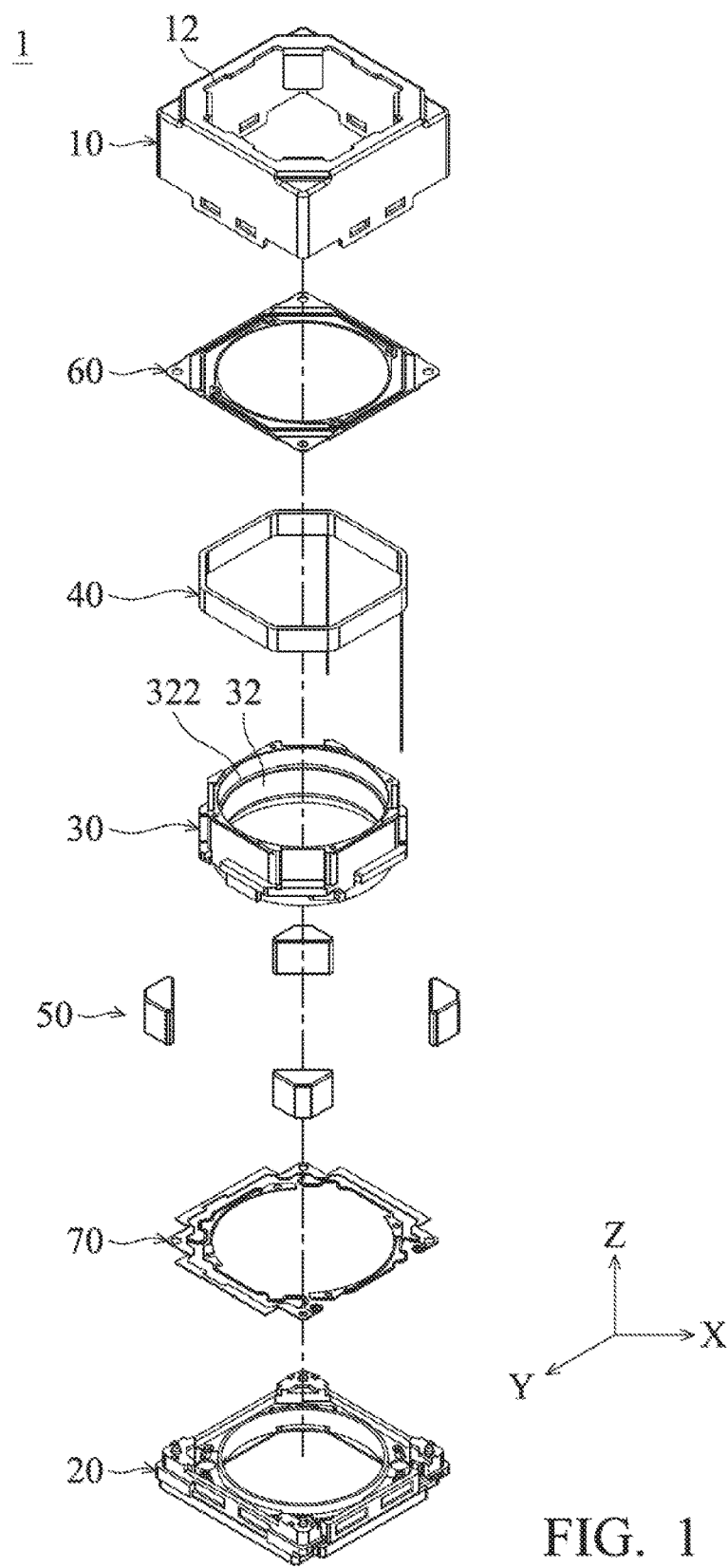
FIG. 1 is an exploded view of a lens driving module in accordance with an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

Moreover, in the following detailed description, the orientations of "on", "over", "above", "under" and "below" are used for representing the relationship between the relative positions of each element in the lens driving module, and are not used to limit the present invention.

Figure 2:
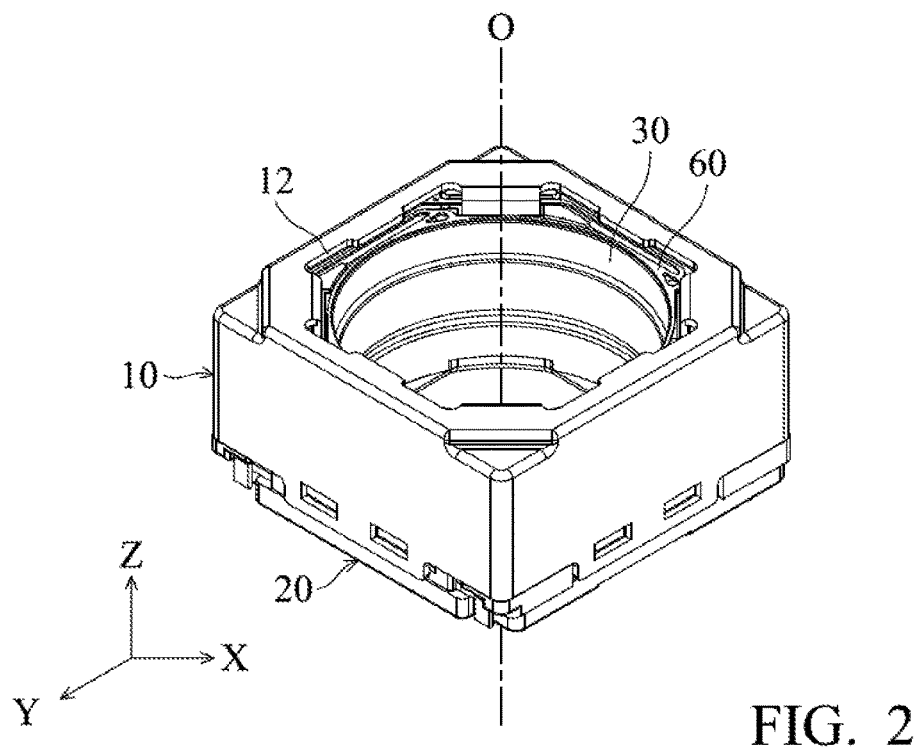
FIG. 2 is a schematic view of the lens driving module in FIG. 1 after assembly.

FIG. 1 and FIG. 2 respectively show an exploded view of a lens driving module 1 in accordance with an embodiment of the invention, and a schematic view of the lens driving module 1 after assembly. The lens driving module 1 may be a Voice Coil Motor (VCM), which defines three axial directions that are perpendicular to each other, namely an X-axis direction, a Y-axis direction, and a Z-axis direction, and includes a lens (not shown) therein, wherein the lens defines an image-capturing optical axis O which is substantially parallel to the Z-axis.

In this embodiment, the lens driving module 1 primarily includes a casing 10, a base 20, a lens carrier 30, a coil 40, a plurality of magnets 50 (e.g. four magnets 50), an upper spring plate 60, and a lower spring plate 70.

The casing 10 has a hollow structure and can be combined with the base 20 to form a receiving space, for receiving and protecting other parts of the lens driving module 1 as described above. Moreover, the casing 10 has an opening 12 through which the lens in the lens driving module 1 can capture light from the outside.

The lens carrier 30 has a substantially octangle periphery and carries the lens therein. As shown in FIG. 1, the lens carrier 30 has a hollow ring structure and a through hole 32, wherein the through hole 32 forms a thread structure 322 corresponding to another thread structure on the lens, such that the lens can be locked in the through hole 32.

The coil 40 is wound around the periphery of the lens carrier 30 and has an octangle shape. It should be realized that a torsion force is generated when the lens is rotated into the through hole 32. Thus, the octangle shaped coil 40 can limit the rotation angle of the lens during assembly, so as to prevent the inner structure of the lens carrier 30 from being damaged by an excessive torsion force.

The magnets 50 are permanent magnets. Moreover, the magnets 50 are fixed at the four respective corners of the base 20 and correspond to the coil 40, such that the magnets 50 and the coil 40 jointly form a VCM electromagnetic driving module for driving the lens carrier 30, and hence the lens therein, to linearly move along the image-capturing optical axis O. By varying the current input into the coil 40, different magnetic fields are generated between the coil 40 and the magnets 50 to drive the lens carrier 30 back and forth along the image-capturing optical axis O, so that focusing or zooming is carried out.

The lens carrier 30 is movably disposed in the receiving space formed by the casing 10 and the base 20 and is elastically clamped by the movable inner frames of the upper spring plate 60 and the lower spring plate 70. Both the upper spring plate 60 and the lower spring plate 70 are elastic metal plates having thin reticulated structures formed by stamping, etching, or laser cutting. Moreover, the upper and lower spring plates 60 and 70 can limit the range in which the lens carrier 30 can be moved and provide the buffer capacity for the displacement of the lens carrier 30 along the X-axis, the Y-axis, and the Z-axis.

Figure 3:
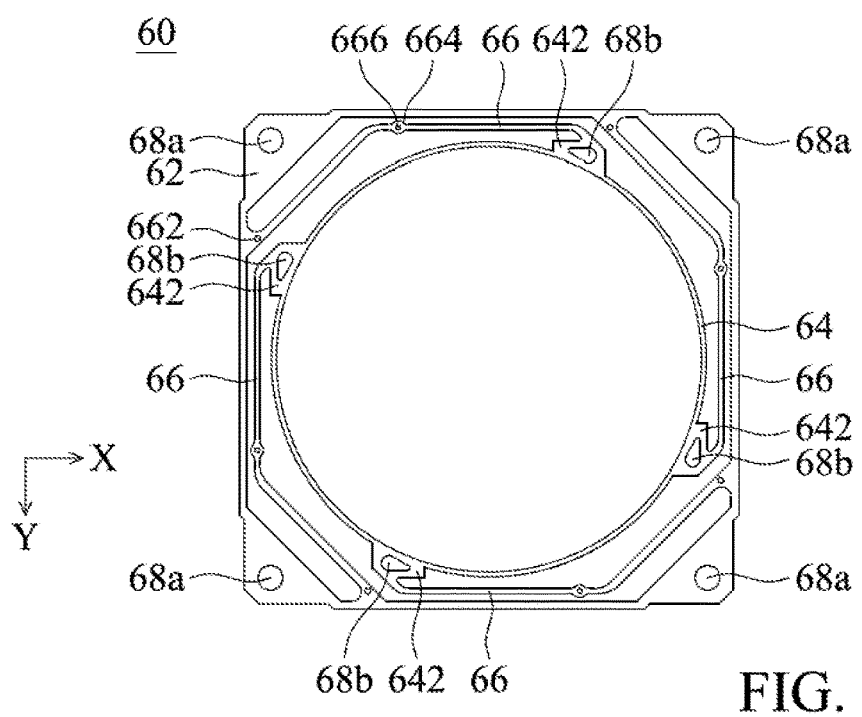
FIG. 3 is a schematic plane view of an upper spring plate in FIG. 2.

FIG. 3 is a schematic plane view of the upper spring plate 60 in FIG. 2. In this embodiment, the upper spring plate 60 includes an outer frame 62 configured to connect with the casing 10 (i.e. a fixed part of the lens driving module 1), an inner frame 64 configured to connect with the lens carrier 30 (i.e. a movable part of the lens driving module 1), and at least one inner string 66 (e.g. four inner strings 66) extended from the outer frame 62 and the inner frame 64 and connected therebetween.

Specifically, the outer frame 62 has a substantially rectangular structure, and its four corners respectively form a hole 68a, such that the outer frame 62 can connect with the casing 10 by some fasteners, such as screws (not shown), passing through the holes 68a. The inner frame 64 substantially has a ring structure and four connection parts 642, wherein each of the connection parts 642 forms a hole 68b, such that the inner frame 64 can connect with the lens carrier 30 by some fasteners, such as screws (not shown), passing through the holes 68b. The inner strings 66 are extended between the outer frame 62 and the connection parts 642 of the inner frame 62 and are symmetrical to each other with equal intervals. Each of the inner strings 66 has at least one thickened part 664. Moreover, each junction of the inner string 66 and the outer frame 62 forms a circular hollow 662, and each thickened part 664 of the inner strings 66 also forms a circular hollow 666.

Note that the inner strings 66 of the upper spring plate 60 are mainly used to increase the buffer capacity for the displacement of the lens carrier 30 along the X-axis, the Y-axis, and the Z-axis. To strengthen the structure of the strings, generally, a thickened part 664 may be formed on the inner string 66, or the junction of the inner string 66 and the outer frame 62 or/and the junction of the inner string 66 and the inner frame 64 may be thickened. However, this will easily cause local stress concentration and then make permanent (plastic) deformation occur at the thickened parts of the inner strings 66 if the stresses generated by those local thickened parts exceed their own yielding stresses after impact. In this embodiment, since the thickened parts 664 of the inner strings 66 and the junctions of the inner strings 66 and the outer frame 62 form a plurality of hollows 666, the stresses can be effectively dispersed and the permanent deformation caused by local stress concentration is thus prevented. Consequently, the structure of the upper spring plate 60 is strengthened.

Figure 4:
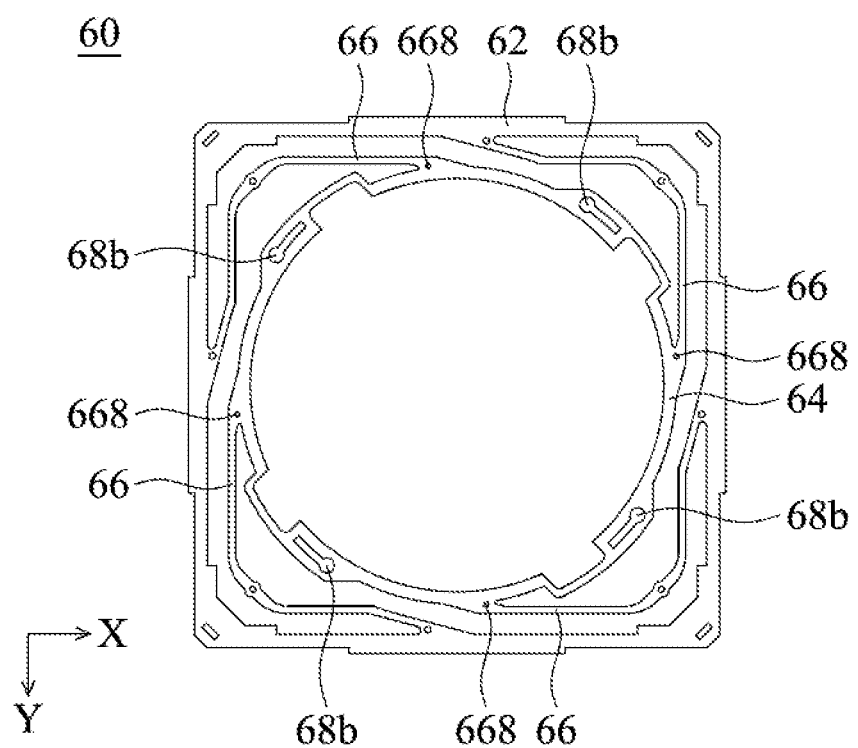
FIG. 4 is a schematic plane view of an upper spring plate in accordance with another embodiment of the invention.

FIG. 4 is a schematic plane view of an upper spring plate 60 in accordance with another embodiment of the invention. This embodiment differs from the upper spring plate 60 of FIG. 3 in that the connection parts 68b of the inner frame 64 in this embodiment are far from the junctions of the inner frame 64 and the inner strings 66, and each junction of the inner frame 64 and the inner string 66 further forms a circular hollow 668. Thus, the stresses that are concentrated on the junctions of the inner frame 64 and the inner strings 66 can also be effectively dispersed, such that the structure of the upper spring plate 60 is strengthened.

Furthermore, in the above embodiments, the hollows 662, 666, and 668 are located at the local stress concentration points on the inner strings 66 of the upper spring plate 60, but the invention is not limited thereto. In some other embodiments, the hollows may also be located at the local stress concentration points on the inner strings of the lower spring plate 70, so as to improve the structural strength of the lower spring plate 70. Specifically, the lower spring plate 70 may include an outer frame configured to connect with the base 20 (i.e. another fixed part of the lens driving module 1), an inner frame (may include two semicircular structures) configured to connect with the lens carrier 30 (i.e. the movable part of the lens driving module 1), at least one inner string (e.g. two inner strings) extended from the outer frame and the inner frame and connected therebetween, and a plurality of hollows (the above structure of the lower spring plate 70 can refer to FIG. 1). It should be realized that the hollows may be located at the thickened parts of the inner strings, the junctions of the inner strings and the outer frame, and the junctions of the inner strings and the inner frame.

Figure 5A:
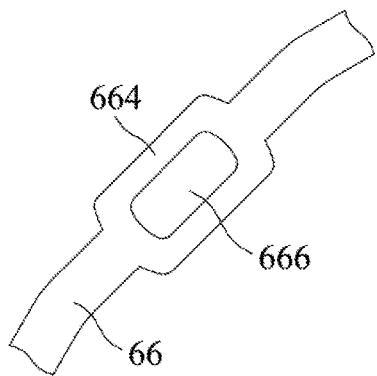
FIGS. 5A-5H are schematic views of a hollow/hollows on an inner string of a spring plate in accordance with some embodiments of the invention.
Figure 5B:
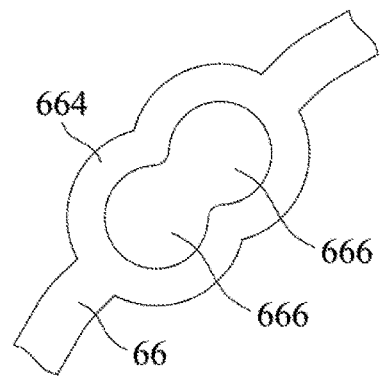
Figure 5C:
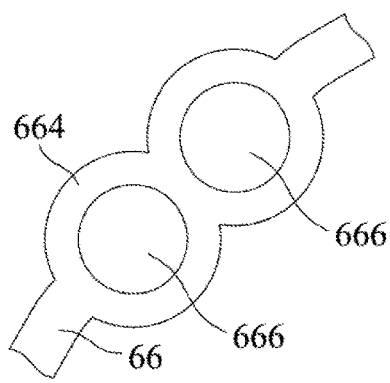
Figure 5D:
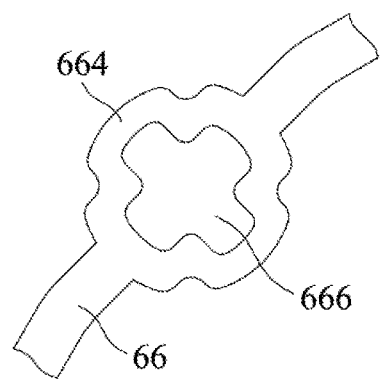
Figure 5E:
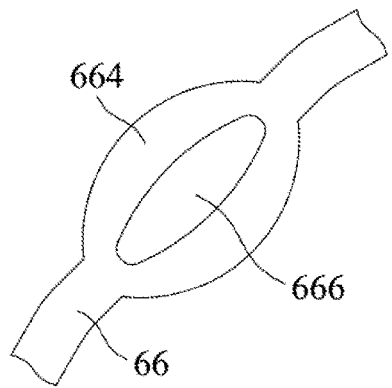
Figure 5F:
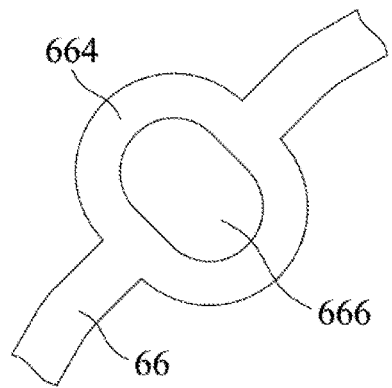
Figure 5G:
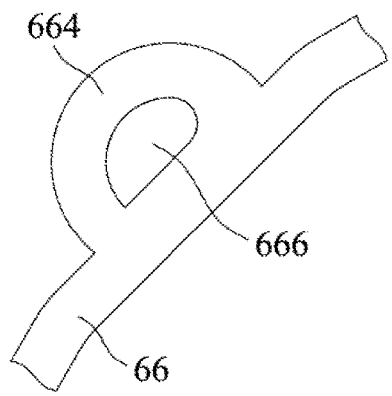
Figure 5H:
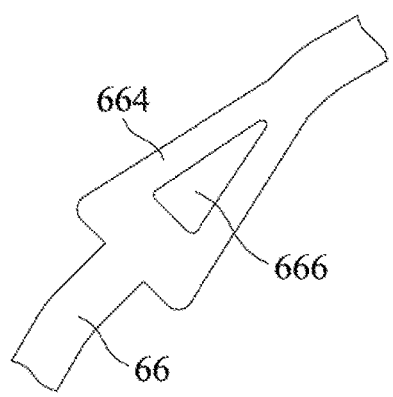

Moreover, the shape and the number of hollows on the inner strings of the spring plates, namely the upper and lower spring plates, may also be changed. FIGS. 5A-5H are schematic views of a hollow/hollows on an inner string of a spring plate in accordance with some embodiments of the invention. As shown in FIG. 5A, the hollow 666 is designed as a rectangular shape to conform to the shape of the thickened part 664 of the string 66. As shown in FIG. 5B, the hollow 666 is designed as a gourd shape to conform to the shape of the thickened part 664 of the string 66. As shown in FIG. 5C, a plurality of hollows 666 (e.g. two hollows 666) are formed on the thickened part 664 of the string 66 and spaced apart from each other. As shown in FIG. 5D, the hollow 666 is designed as a cross shape to conform to the shape of the thickened part 664 of the string 66. As shown in FIGS. 5E-5F, the hollow 666 is designed as an oval shape to conform to the shape of the thickened part 664 of the string 66. As shown in FIG. 5G, the hollow 666 is designed as a teardrop shape to conform to the shape of the thickened part 664 of the string 66. As shown in FIG. 5H, the hollow 666 is designed as a triangle shape to conform to the shape of the thickened part 664 of the string 66.

Although the hollow/hollows 666 with various shapes and numbers shown in FIGS. 5A-5H are formed on the thickened part 664 of the inner string 66, they may also be formed at the junctions of the inner strings 66 and the inner frame or/and at the junctions of the inner strings 66 and the outer frame.

As described above, the invention provides a lens driving module and a spring plate thereof. The spring plate (e.g. the upper spring plate and/or the lower spring plate) of the lens driving module includes an outer frame, an inner frame, at least one inner string, and at least one hollow that are integrally formed in one piece, wherein the hollow is located at the local stress concentration point on the inner string, thus effectively dispersing stress and preventing the permanent deformation from occurring at the inner string. Consequently, the life of the whole lens driving module is extended.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A spring plate of a lens driving module, comprising:
an outer frame, configured to connect with a fixed part of the lens driving module;
an inner frame, configured to connect with a movable part of the lens driving module;
an inner string, extended from the outer frame and the inner frame and connected therebetween, wherein a first junction is formed by the outer frame and the inner string, and a second junction is formed by the inner string and the inner frame; and
at least one first hollow portion, disposed and surrounded by the outer frame and the inner string at a main body of the first junction or disposed and surrounded by the inner string and the inner frame at a main body of the second junction, and not extending on the main body of the inner string, and keeping the first hollow portion open when the outer and inner frames respectively connect with the fixed and movable parts, for dispersing stress.

2. The spring plate of a lens driving module as claimed in claim 1, further comprising a plurality of first hollow portions respectively disposed at the main body of the first junction and at the main body of the second junction.

3. The spring plate of a lens driving module as claimed in claim 1, further comprising at least one second hollow portion disposed on the inner string.

4. The spring plate of a lens driving module as claimed in claim 3, wherein the inner string has a thickened part with the second hollow portion disposed thereon.

5. The spring plate of a lens driving module as claimed in claim 4, wherein a shape of the second hollow portion conforms to that of the thickened part.

6. The spring plate of a lens driving module as claimed in claim 5, wherein the shape of the second hollow portion comprises a circle, rectangle, cross, oval, gourd, teardrop, or triangle shape.

7. The spring plate of a lens driving module as claimed in claim 4, further comprising a plurality of second hollow portions disposed on the thickened part and spaced apart from each other.

8. The spring plate of a lens driving module as claimed in claim 1, further comprising a plurality of inner strings and a plurality of second hollow portions, wherein the second hollow portions are disposed on the inner strings.

9. The spring plate of a lens driving module as claimed in claim 1, wherein the outer frame, the inner frame, the inner string, and the first hollow portion are integrally formed in one piece.

10. The spring plate of a lens driving module as claimed in claim 1, wherein the spring plate comprises metal material.

11. A lens driving module, comprising:
a casing;
a base, connected with the casing to form a receiving space;
a lens carrier, movably disposed in the receiving space; and
a spring plate, comprising:
an outer frame, connected with the casing or the base;
an inner frame, connected with the lens carrier;
an inner string, extended from the outer frame and the inner frame and connected therebetween, wherein a first junction is formed by the outer frame and the inner string, and a second junction is formed by the inner string and the inner frame; and
at least one first hollow portion, disposed and surrounded by the outer frame and the inner string at a main body of the first junction or disposed and surrounded by the inner string and the inner frame at a main body of the second junction, and not extending on the main body of the inner string and keeping the first hollow portion open when the outer and inner frames respectively connect with the fixed and movable parts, for dispersing stress.

12. The lens driving module as claimed in claim 11, further comprising a plurality of first hollow portions respectively disposed at the main body of the first junction and at the main body of the second junction.

13. The lens driving module as claimed in claim 11, further comprising at least one second hollow portion disposed on the inner string.

14. The lens driving module as claimed in claim 13, wherein the inner string has a thickened part with the second hollow portion disposed thereon.

15. The lens driving module as claimed in claim 14, wherein a shape of the second hollow portion conforms to that of the thickened part.

16. The lens driving module as claimed in claim 15, wherein the shape of the second hollow portion comprises a circle, rectangle, cross, oval, gourd, teardrop, or triangle shape.

17. The lens driving module as claimed in claim 16, further comprising a plurality of second hollow portions disposed on the thickened part and spaced apart from each other.

18. The lens driving module as claimed in claim 11, further comprising a plurality of inner strings and a plurality of second hollow portions, wherein the second hollow portions are disposed on the inner strings.

19. The lens driving module as claimed in claim 11, wherein the outer frame, the inner frame, the inner string, and the first hollow portion are integrally formed in one piece.

20. The lens driving module as claimed in claim 11, wherein the spring plate comprises metal material.

* * * * *